(12) United States Patent
Hahm et al.

(10) Patent No.: US 7,450,774 B2
(45) Date of Patent: Nov. 11, 2008

(54) METHOD OF CHANGING BIT RATE BY CHANGING CODEWORD OF COMPRESSED IMAGE BIT STREAM

(75) Inventors: Cheul-hee Hahm, Gyeonggi-do (KR); Jae Moon Jo, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 541 days.

(21) Appl. No.: 10/126,981

(22) Filed: Apr. 22, 2002

(65) Prior Publication Data
US 2003/0026491 A1 Feb. 6, 2003

(30) Foreign Application Priority Data
Aug. 4, 2001 (KR) ............... 2001-47141

(51) Int. Cl.
*G06K 9/00* (2006.01)
*G06K 9/36* (2006.01)
*G06K 9/46* (2006.01)
*H04N 1/41* (2006.01)
*H04N 1/413* (2006.01)

(52) U.S. Cl. .......... 382/245; 382/166; 358/426.13; 358/426.14

(58) Field of Classification Search .......... 382/166, 382/244–251; 358/426.13, 426.14; 370/395.64, 370/477; 375/240.03, 240.24
See application file for complete search history.

(56) References Cited

U.S. PATENT DOCUMENTS 5,604,498 A * 2/1997 Park .................. 341/65
5,754,235 A * 5/1998 Urano et al. .......... 375/240.03
5,812,073 A * 9/1998 Lee et al. .................. 341/59
5,884,269 A * 3/1999 Cellier et al. ............ 704/501
6,181,711 B1 * 1/2001 Zhang et al. ............ 370/468
6,185,339 B1 * 2/2001 Ozaki .................... 382/232
6,498,865 B1 * 12/2002 Brailean et al. ......... 382/239
6,549,671 B1 * 4/2003 Miyagoshi et al. ....... 382/239
6,771,703 B1 * 8/2004 Oguz et al. .......... 375/240.03
6,829,300 B1 * 12/2004 Ichioka ............... 375/240.03
2002/0102027 A1 * 8/2002 Miyake et al. ........... 382/239

OTHER PUBLICATIONS

Nakajima et al. ("Rate Conversion of MPEG Coded Video by Re-quantization Process," IEEE Proc. 1995 ICIP, vol. III, Sep. 1995, pp. 408-411).*
Recommendation ITU-T H.262 (1995E).

* cited by examiner

*Primary Examiner*—Yubin Hung
(74) *Attorney, Agent, or Firm*—Staas & Halsey LLP

(57) ABSTRACT

An apparatus and a method of changing a bit rate of a compressed image bit stream by changing a codeword so as to easily change the bit rate and reduce a changing loss. The apparatus for changing a bit rate, in which an input bit stream generated by an image compression encoding method is changed into an output bit stream having a desired bit rate, includes a changing codeword determiner which selects codewords to replace the codewords of the input bit stream, and a codeword changer which changes the codewords of the input bit stream into the codewords selected by the changing codeword determiner. The method and the apparatus can be applied to image services provided through the Internet and receiving apparatuses supporting the Personal Video Recorder (PVR) function. Particularly, the method of changing the bit rate of a compressed image bit stream changes the codewords of input transform coefficients so as to easily change the bit rate and reduce the changing loss.

7 Claims, 4 Drawing Sheets

FIG. 1 (PRIOR ART)
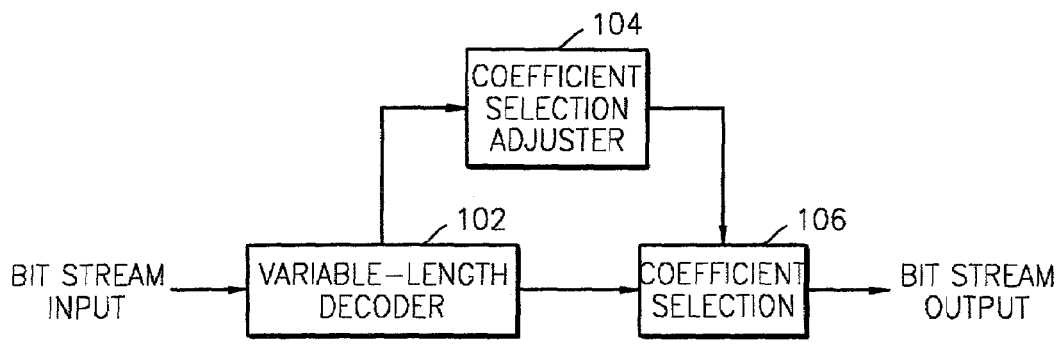
FIG. 2A (PRIOR ART)  FIG. 2B (PRIOR ART)
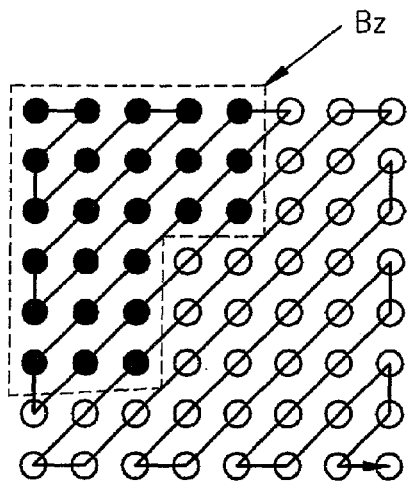
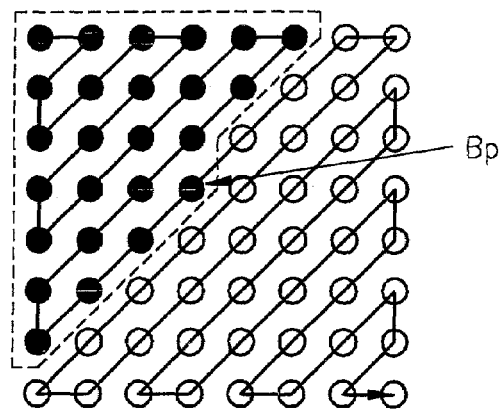

METHOD OF CHANGING BIT RATE BY CHANGING CODEWORD OF COMPRESSED IMAGE BIT STREAM

CROSS-REFERENCE TO RELATED APPLICATIONS

This application claims the benefit of Korean Application No. 2001-47141, filed Aug. 4, 2001, in the Korean Industrial Property Office, the disclosure of which is incorporated herein by reference.

BACKGROUND OF THE INVENTION

1. Field of the Invention

The present invention relates to a method of changing a bit rate of a compressed image bit stream, and more particularly, to an apparatus and a method of changing a bit rate of a compressed image bit stream by changing a codeword so as to easily change the bit rate and reduce a changing loss.

2. Description of the Related Art

In line with the recent development of Internet-related technologies, images as well as text and voice data are quickly distributed throughout the Internet. Particularly, an industry which provides image services through the Internet is rapidly growing.

In general, a service provider transmits image data from a source, through diverse networks, to a destination. A destination party negotiates with the service provider for the Quality of Service (QoS), considering the capacity and price of a receiving terminal, network situations, and so on. One of the leading QoS parameters used is a bit rate.

After the negotiation, if a compressed image bit stream which has been already stored does not match the agreed on QoS, the service provider has to change the compressed image bit stream to satisfy the agreed on QoS. Generally, the agreed on QoS is lower than the QoS of the stored compressed image bit stream.

A Personal Video Recorder (PVR) function, including simultaneous playback and recording, is also in demand by users of televisions and image receiving apparatuses for the Internet. With the PVR function, a receiving apparatus temporarily stores a received compressed image bit stream in a Hard Disc Drive (HDD). Since the users want to store as many programs as possible in the HDD, changing the bit rate of the compressed image bit stream is also needed with respect to the PVR function.

Methods which lower a bit rate of a compressed image bit stream without changing a syntax of the compressed image bit stream are broadly divided into a transform coefficient re-quantization method and a transform coefficient selection method.

In a transform coefficient re-quantization method, a transform coefficient, for example, a discrete coefficient transform DCT coefficient, is re-quantized using a new quantization process so as to have the bit rate satisfy a desired output bit rate. Generally, this method is performed through a variable length decoder, a dequantizer, a re-quantizer, and a variable length encoder, and has a complicated structure.

In a transform coefficient selection method, part of the transform coefficients are selected so as to reconstruct the output bit rate. The transform coefficient selection method has a simpler structure than the transform coefficient re-quantization method.

FIG. 1 shows a block diagram of the structure of a conventional apparatus which changes a bit rate using a known transform coefficient selection method. The apparatus comprises a coefficient selection adjuster 104 which selects part of decoded transform coefficients that were decoded through a variable length decoder 102. Here, coefficients to be selected are determined by a rule of the coefficient selection adjuster 104.

FIGS. 2A and 2B show a zonal masking type and a breaker pointer type of the conventional transform coefficient selection method.

As shown in FIG. 2A, using a zonal mask Bz, which is determined with respect to an output bit rate, transform coefficients outside the zonal mask Bz are discarded while the transform coefficients inside the mask are selected.

As shown in FIG. 2B, using a break pointer Bp, which is determined with respect to an output bit rate, transform coefficients which are scanned after the break pointer Bp are discarded while transform coefficients which are scanned prior to the break pointer Bp are selected.

Since the transform coefficient re-quantization method is performed through a variable length decoder, dequantizer, re-quantizer, and a variable length encoder, the transform coefficient re-quantization method has a structure more complicated than that of the transform coefficient selection method using the variable length decoder, the coefficient selector, and the coefficient selection adjuster. However, the transform coefficient selection method discards part of the transform coefficients, which results in a picture quality that is inferior to that of the transform coefficient re-quantization method.

SUMMARY OF THE INVENTION

Accordingly, it is an object of the present invention to provide an apparatus for changing a bit rate of a compressed image bit stream, so as to easily change the bit rate of the compressed image bit stream encoded by a compressed image encoding method and reduce a changing loss.

It is another object of the present invention to provide a method of changing a bit rate of a compressed image bit stream, so as to easily change the bit rate of the compressed image bit stream encoded by a compressed image encoding method and reduce a changing loss.

Additional objects and advantages of the invention will be set forth in part in the description which follows, and, in part, will be obvious from the description, or may be learned by practice of the invention.

To accomplish the above and other objects of the present invention, there is provided an apparatus for changing a bit rate, in which an input bit stream generated by an image compression encoding method is changed into an output bit stream having a desired bit rate, comprising a changing codeword determiner which selects replacement codewords to replace the codewords of the input bit stream, and a codeword changer which changes the codewords of the input bit stream into the replacement codewords selected by the changing codeword determiner.

According to an aspect of the present invention, the changing codeword determiner selects each of the replacement codewords having a shortest code length among candidate codewords, wherein each of the candidate codewords comprises a run length which is the same as a run length of a codeword to be changed, and a preset value of difference between a level of the corresponding candidate codeword and a level of the codeword to be changed. The preset value of difference is 1.

To accomplish the above and other objects of the present invention, there is provided a method of changing a bit rate of a compressed image bit stream, in which the bit rate of the compressed image bit stream is changed into an output bit stream having a desired bit rate, the method comprising selecting replacement codewords and codewords to be changed in an input bit stream, wherein each codeword of the compressed image bit stream comprises a corresponding variable length codeword having a corresponding run length and level information, and changing the codewords to be changed into the replacement codewords.

According to another aspect of the present invention, selecting each of the replacement codewords comprises selecting a codeword having a shortest code length among candidate codewords, wherein each of the candidate codewords comprises a run length which is the same as a run length of a codeword to be changed, and a preset value of difference between a level of the corresponding candidate codeword and a level of the codeword to be changed. The preset value of difference is 1.

BRIEF DESCRIPTION OF THE DRAWINGS

The above and other objects and advantages of the present invention will become more apparent and more readily appreciated by describing in detail preferred embodiments thereof with reference to the accompanying drawings in which:

FIG. 1 is a block diagram of the structure of a conventional apparatus which changes a bit rate using a transform coefficient selection method;

FIGS. 2A and 2B are diagrams which illustrate a zonal making type and a break pointer type of the conventional transform coefficient selection method;

DETAILED DESCRIPTION OF THE PREFERRED EMBODIMENTS

Figure 3:
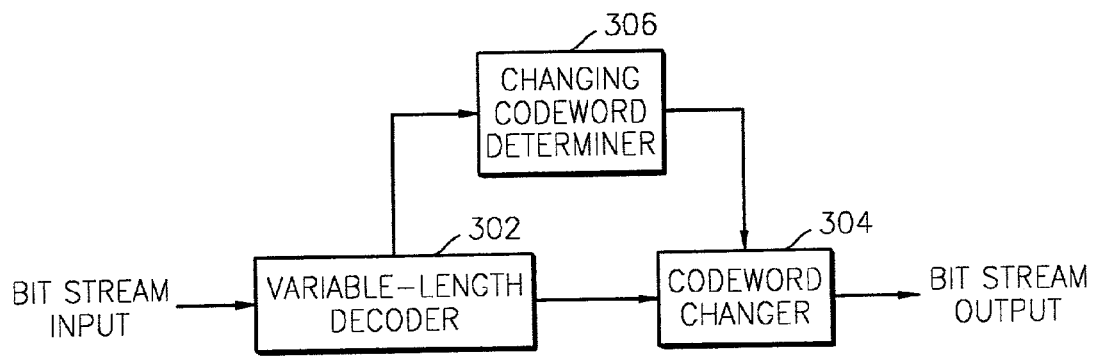
FIG. 3 is a block diagram of the structure of an apparatus which changes a bit rate of a compressed image bit stream according to an embodiment of the present invention.

Reference will now be made in detail to the present preferred embodiments of the present invention, examples of which are illustrated in the accompanying drawings, wherein like reference numerals refer to like elements throughout.

FIG. 3 shows a block diagram of the structure of an apparatus which changes a bit rate of a compressed image bit stream according to an embodiment of the present invention. The apparatus for changing the bit rate includes a variable length decoder 302 which performs a variable length decoding of an input bit stream and outputs codewords, each of the code words having a run length of zero transform coefficients and a subsequent non-zero transform coefficient. The apparatus for changing the bit rate further includes a codeword changer 304 which changes a codeword of a transform coefficient, and a changing codeword determiner 306 which selects a codeword to be changed.

The changing codeword determiner 306 selects codewords between the codewords of input transform coefficients and the codewords of output transform coefficients so that the selected codewords satisfy the following requirements:

(1) A run length of a codeword, prior to change, is the same as a run length of a replacement codeword.

(2) The difference between a level of a codeword, prior to change, and a level of a replacement codeword is 1.

The codeword changer 304 changes the codeword of an input transform coefficient with respect to a result determined by the changing codeword determiner 306.

The transform coefficient selection methods using a zonal mask or a break pointer (FIGS. 2A-2B) have simpler structures than that of the transform coefficient re-quantization method (not shown). However, the transform coefficient selection methods produce a lower picture quality of an output bit stream. Therefore, an improved method of changing a bit rate, according to the present invention, is provided so as to maintain the simplicity of the transform coefficient selection method and at the same time satisfy the efficiency of the transform coefficient re-quantization method. In the present method of changing a bit rate, a codeword of an input transform coefficient is changed so as to satisfy an output bit rate.

A codeword of a transform coefficient is formed with a run length and a quantization level. To change the codeword of an input transform coefficient, candidate codewords which have the same run lengths but have different quantization levels that are within a predetermined range, for example 1, are first selected. Then, a codeword having the shortest code length in the selected candidate codewords is selected and output as the codeword of the corresponding output transform coefficient.

By applying this operation to an input bit stream, a primary output bit stream is obtained. If the bit rate of the primary output bit stream does not satisfy a desired bit rate, the operation is repeated until the bit rate of an obtained bit stream satisfies the desired bit rate.

Figure 4:
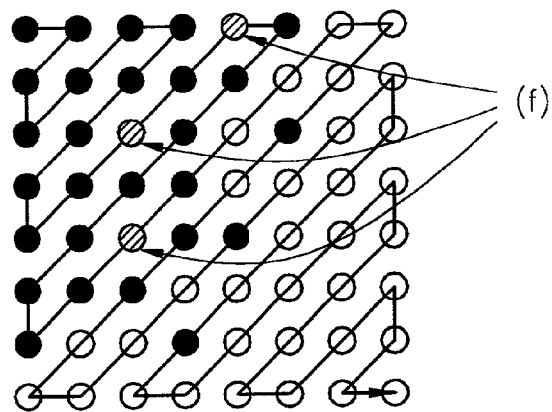
FIG. 4 is a schematic diagram which illustrates a method of changing a bit rate according to the present invention.

FIG. 4 shows a schematic diagram which illustrates a the method of changing a bit rate according to the present invention. The transform coefficients marked with 'f' in FIG. 4 indicate that the codeword changing for each of the transform coefficients has been performed. Unlike the conventional transform coefficient selection method, the present method does not use an operation which discards part of the transform coefficients. Therefore, the picture quality of an output bit stream is maintained. In addition, unlike the conventional transform coefficient requantization method, the present method only uses an operation which changes codewords, while operations such as dequantization and re-quantization are not used. Accordingly, changing a bit rate is easily performed and the structure of an apparatus using the present method is simpler than the conventional apparatus employing the transform coefficient re-quantization method.

The method of changing a bit rate as shown in FIG. 4 is performed as follows.

First, a codeword to be changed is selected in an input bit stream formed with variable length codewords. At this time, a codeword to be changed and a replacement codeword should satisfy the following requirements:

(1) The run length of the codeword to be changed is the same as the run length of the replacement codeword.

(2) The difference between the level of the codeword to be changed and the level of the replacement codeword is 1.

Next, a changing operation is performed. Here, the codeword to be changed is changed with a codeword which is selected among candidate codewords which satisfy the above requirements (1) and (2), and satisfy a given bit rate so as to maintain the picture quality as much as possible.

Finally, if the required bit rate is not satisfied, the above two operations are repeated after lowering the level by 1 until the required bit rate is satisfied.

Figure 5:
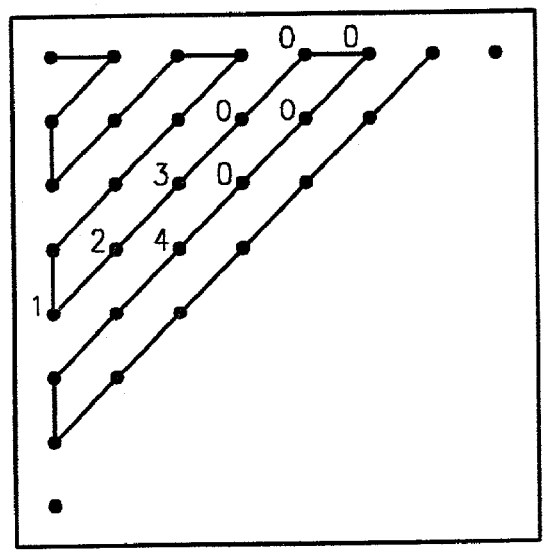
FIG. 5 is a schematic diagram which illustrates an example of encoding a Discrete Coefficient Transform (DCT) coefficient.

FIG. 5 shows a schematic diagram which illustrates an example of encoding a Discrete Coefficient Transform (DCT) coefficient. A macro block is formed of 4 luminance signal DCT blocks and 2 chrominance signal DCT blocks. The size of each DCT block is, for example, 8×8 pixels. A DCT coefficient obtained by transforming a DCT block is formed of one DC coefficient and 63 AC coefficients. Among them, the DC coefficient is encoded by a differential encoding method, and the AC coefficients are variable length encoded by a zigzag scan method and a run length method as shown in FIG. 5.

In the differential encoding of the DC coefficient, the difference between the current DC coefficient and the previous DC coefficient is encoded. Meanwhile, the AC coefficients are variable length encoded by the number of '0' coefficients in a run of 0's (run length) and the value of a non-zero coefficient (level), and a run length and a level are bound so as to be expressed in one codeword. In FIG. 5, for example, five '0' coefficients that proceed before a coefficient having a value of '4' are encoded into a codeword expressing (run length; 5, level; 4).

Based on the probabilities of the occurrence of corresponding run lengths and levels, an encoding table is produced. In the encoding table, the least number of bits is assigned to a run length and level that has the highest probability.

Figure 6:
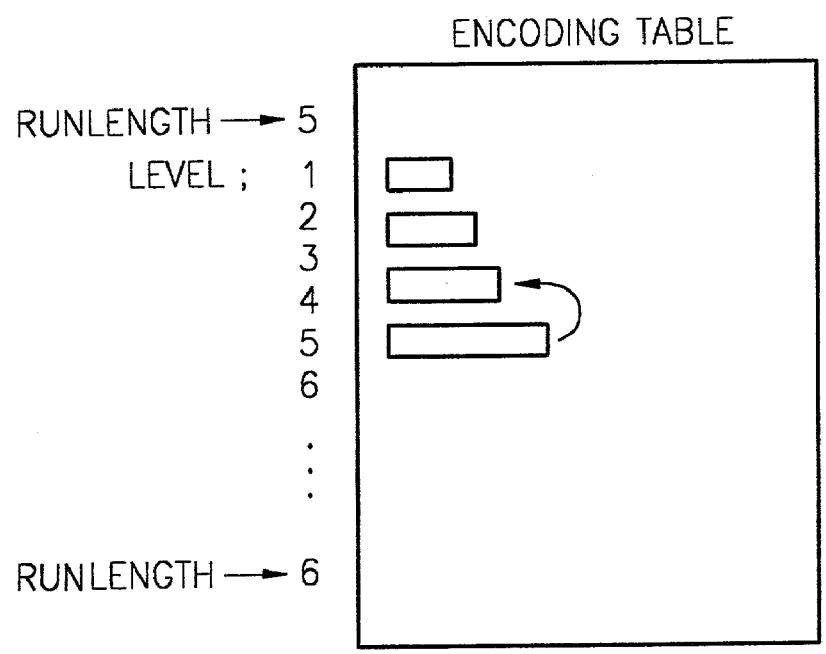
FIG. 6 is a diagram which illustrates an example of an encoding table.

FIG. 6 illustrates an example of the encoding table. The encoding table is indexed by increasing order of a run length, and indexed by increasing order of a level in the same run length. The encoding table of FIG. 6 illustrates a run length of '5', and that the length of a rectangle of the encoding table corresponds to the number of bits a codeword has.

As shown in FIG. 6, in response to a change of the number of a level, the number of bits in a codeword changes. For example, where the level changes from '5' to '4', the number of bits in a codeword changes.

A change in the level of a coefficient, that is, a change in the value of the coefficient indicates that the frequency component of the coefficient changes, and the picture quality changes. Thus, while the method of changing a bit rate according to the present invention may lower the picture quality in this sense, the number of the whole pixels is maintained.

Figure 7:
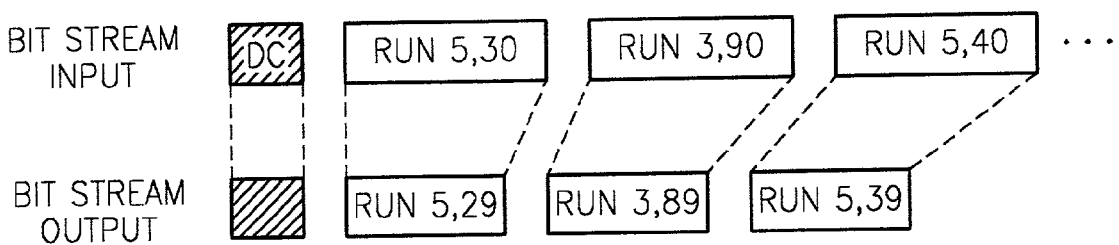
FIG. 7 is a schematic diagram which illustrates a result of a transcoding according to the present invention.

FIG. 7 shows a result of a transcoding (codeword changing) according to the present invention. In each macro block in a bit stream obtained by encoding, the result of encoding the DC coefficient is placed at the front of codewords, which are obtained by variable length encoding the AC coefficients by the run length method. Each codeword has a predetermined number of bits and the length of each rectangle in FIG. 7 indicates the number of bits.

In FIG. 7, the first row represents an input bit stream and the second row represents an output bit stream. Each codeword in the input bit stream is replaced by a codeword having a smaller number of bits, the same run length, and a level smaller by 1 so as to form the output bit stream having a lower bit rate.

A method of satisfying the bit rate according to the present invention, where a desired bit rate is provided, will now be explained.

First, for each codeword, a search is made for a codeword which has the same run length and a smaller number of bits where the level value of the codeword is decreased by 1. The number of bits which can be reduced by the detected codeword is calculated. If the calculated number of bits fully satisfies a desired bit rate, the detected codewords are changed from higher frequency components until the number of bits which is reduced by codeword-changing satisfies the desired bit rate.

On the contrary, if the calculated number of bits does not satisfy the desired bit rate, for each codeword, a search is made for a codeword which has the smaller number of bits where the level value of the codeword is decreased by 2. The number of bits which can be reduced by the detected codewords is calculated again. If the calculated number of bits fully satisfies the desired bit rate, detected codewords are changed from higher frequency components until the number of bits which is reduced by codeword-changing satisfies the desired bit rate.

The above operations are repeated as necessary so as to have the bit rate of the output bit stream satisfy the desired bit rate.

As described above, the method of changing the bit rate of a compressed image bit stream according to the present invention enables low loss transcoding by replacing the codeword of an input transform coefficient with a codeword having a shorter code length and a quantization level which is lowered to a predetermined level.

It is understood that the present invention can be applied to image services provided through the Internet and receiving apparatuses supporting the Personal Video Recorder (PVR) function. Particularly, a method of changing a bit rate of a compressed image bit stream according to the present invention changes the codewords of input transform coefficients so as to easily change the bit rate and reduce a changing loss. It is also understood that a method of changing a bit rate according to the present invention can be implemented by software.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. An apparatus for changing a bit rate, in which an input bit stream generated by an image compression encoding method is changed into an output bit stream having a desired bit rate, the apparatus comprising:

a changing codeword determiner to select a candidate codeword for each codeword in the input bit stream, each codeword having a run length and a level for transform coefficients; and a codeword changer to selectively change each codeword of the input bit stream into the candidate codeword selected by the changing codeword determiner based on a determination that a number of bits can be reduced by using the candidate codeword in the output bit stream, wherein the changing codeword determiner selects as the candidate codeword shortest one of the candidate codewords satisfying two requirements: (1) having a same run length that of the codeword in the input stream, and (2) having a level less than that of the codeword in the input stream by a preset value, wherein the changing codeword determiner and the codeword changer repeat codeword selection and codeword changing for the output bit stream, after increasing the preset value by 1 for each repetition, until the desired bit rate is satisfied.

2. The apparatus of claim 1, wherein the preset value is 1.

3. The apparatus of claim 1, further comprising a variable length decoder that performs a variable length decoding operation of the input bit stream and outputs codewords.

4. An apparatus for changing a bit rate of a compressed bit stream, in which an input bit stream is changed into an output bit stream having a desired bit rate, the apparatus comprising:
- a changing codeword determiner to select a candidate codeword for each codeword in the input bit stream, each codeword having a run length and a level for transform coefficients; and
- a codeword changer to selectively change each codeword of the input bit stream into the candidate codeword based on a determination that a number of bits can be reduced by using the candidate codeword in the output bit stream, the candidate codeword having a smaller number of bits, a same run length, and a level smaller by a preset value than that of the codeword in the input data stream, so as to form the output bit stream having the desired bit rate,
- wherein the changing codeword determiner and the codeword changer repeat codeword selection and codeword changing for the output bit stream,
- after increasing the preset value by 1 for each repetition, until the desired bit rate is satisfied.

5. The apparatus of claim 4, wherein the preset value is 1.

6. A computer readable medium encoded with computer executable instructions for implementing a method of changing a bit rate of a compressed image bit stream performed by a computer, in which a bit rate of an input bit stream is changed into an output bit stream having a desired bit rate, the method comprising:
- selecting a candidate codeword for each codeword in an input bit stream, each codeword having a run length and a level for transform coefficients; and
- selectively changing each codeword of the input bit stream into the selected candidate codeword based on a determination that a number of bits can be reduced by using the candidate codeword in the output bit stream,
- wherein the selecting of the candidate codeword further comprises selecting as the candidate codeword a shortest one of the candidate code words satisfying two requirements: (1) having a same run length as that of the codeword in the input stream, and (2) having a level less than that of the codeword in the input stream by a preset value,
- wherein the selecting and selectively changing are repeated for the output bit stream with respect to a result of a previous codeword selection and codeword changing,
- after increasing the preset value by 1, until the bit rate of the output bit stream satisfies the desired bit rate.

7. A computer readable medium encoded with computer executable instructions for implementing a method of changing a bit rate of a compressed bit stream by a computer, in which an input bit stream is changed into an output bit stream having a desired bit rate, the method comprising:
- selecting a candidate codeword for each codeword in the input bit stream; and
- selectively changing each codeword of the input bit stream into the selected candidate codeword based on a determination that a number of bits can be reduced by using the candidate codeword in the output bit stream, the candidate codeword having a smaller number of bits, a same run length, and a revel smaller by a preset value than that of the codeword in the input bit stream,
- wherein a run length and level of the codeword to be changed is included in an encoding data set, wherein the encoding data set is updated in response to the changing of the codeword into the candidate codeword,
- wherein the selecting and selectively changing are repeated with respect to a result of a previous codeword selection and codeword changing for the output bit stream,
- after increasing the preset value by 1, until the bit rate of the output bit stream satisfies the desired bit rate.

* * * * *

UNITED STATES PATENT AND TRADEMARK OFFICE
CERTIFICATE OF CORRECTION

| | | |
|---|---|---|
| PATENT NO. | : 7,450,774 B2 | Page 1 of 1 |
| APPLICATION NO. | : 10/126981 | |
| DATED | : November 11, 2008 | |
| INVENTOR(S) | : Cheul-hee Hahm et al. | |

It is certified that error appears in the above-identified patent and that said Letters Patent is hereby corrected as shown below:

Column 6, Line 54, change "codeword shortest" to --codeword a shortest--.

Column 6, Line 56, change "length that" to --length as that--.

Column 8, Line 3, change "code words" to --codewords--.

Column 8, Line 25, change "revel" to --level--.

Signed and Sealed this

Tenth Day of February, 2009

JOHN DOLL
*Acting Director of the United States Patent and Trademark Office*